(12) United States Patent
Rakotoarisoa et al.

(10) Patent No.: US 12,000,303 B2
(45) Date of Patent: Jun. 4, 2024

(54) HYBRIDIZATION OF THE FIBERS OF THE FIBROUS REINFORCEMENT OF A FAN BLADE

(71) Applicant: Safran Aircraft Engines, Paris (FR)

(72) Inventors: Carole Onja Rakotoarisoa, Moissy-Cramayel (FR); Teddy Fixy, Moissy-Cramayel (FR); Guillaume Pascal Jean-Charles Gondre, Moissy-Cramayel (FR); Julien Paul Schneider-Die-Gross, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/039,611

(22) PCT Filed: Nov. 29, 2021

(86) PCT No.: PCT/FR2021/052119
§ 371 (c)(1),
(2) Date: May 31, 2023

(87) PCT Pub. No.: WO2022/117938
PCT Pub. Date: Jun. 9, 2022

(65) Prior Publication Data
US 2024/0093611 A1    Mar. 21, 2024

(30) Foreign Application Priority Data
Dec. 3, 2020  (FR) ........................................ 2012586

(51) Int. Cl.
*F01D 5/14* (2006.01)
*F01D 5/28* (2006.01)

(52) U.S. Cl.
CPC ............. *F01D 5/147* (2013.01); *F01D 5/141* (2013.01); *F01D 5/282* (2013.01); *F05D 2240/303* (2013.01); *F05D 2300/6034* (2013.01)

(58) Field of Classification Search
CPC .......... F01D 5/147; F01D 5/141; F01D 5/282; F01D 21/045; F05D 2240/303;
(Continued)

(56) References Cited

U.S. PATENT DOCUMENTS

| 2015/0315920 A1 | 11/2015 | Illand |
| 2019/0323357 A1 | 10/2019 | Courtier et al. |
| 2021/0396142 A1 | 12/2021 | De Gaillard et al. |

FOREIGN PATENT DOCUMENTS

| CN | 102817794 B | 7/2014 |
| EP | 3 581 764 A1 | 12/2019 |

(Continued)

OTHER PUBLICATIONS

French Preliminary Search Report for French Application No. FR2012586, dated Sep. 8, 2021.
(Continued)

*Primary Examiner* — Aaron R Eastman
(74) *Attorney, Agent, or Firm* — Birch, Stewart, Kolasch & Birch, LLP

(57) ABSTRACT

The invention relates to a fan blade (3) made of composite material the fibrous reinforcement of which comprises first strands (12) having a first stiffness, second strands (13) having a second stiffness and third strands (14) having a third stiffness lower than the first stiffness and greater than the second stiffness, the blade comprising a first portion (15) comprising only first strands (12), a second portion (16) comprising only second strands (13) and a third portion (17) which is located between the first and second portions (15,
(Continued)

16) and which comprises both first, second and third strands (12, 13, 14); there is a gradual transition of properties at the interface between the different portions (15, 16, 17).

17 Claims, 4 Drawing Sheets

(58) Field of Classification Search
CPC ......... F05D 2300/6034; F05D 2240/30; F05D 2300/603; F05D 2300/614; D10B 2505/02; D03D 25/005; B29B 11/16; Y02T 50/60
See application file for complete search history.

(56) References Cited

FOREIGN PATENT DOCUMENTS

| | | |
|---|---|---|
| FR | 2 998 827 A1 | 6/2014 |
| FR | 3 087 701 A1 | 5/2020 |

OTHER PUBLICATIONS

International Search Report and Written Opinion of the International Searching Authority for International Application No. PCT/FR2021/052119, dated Mar. 15, 2022.

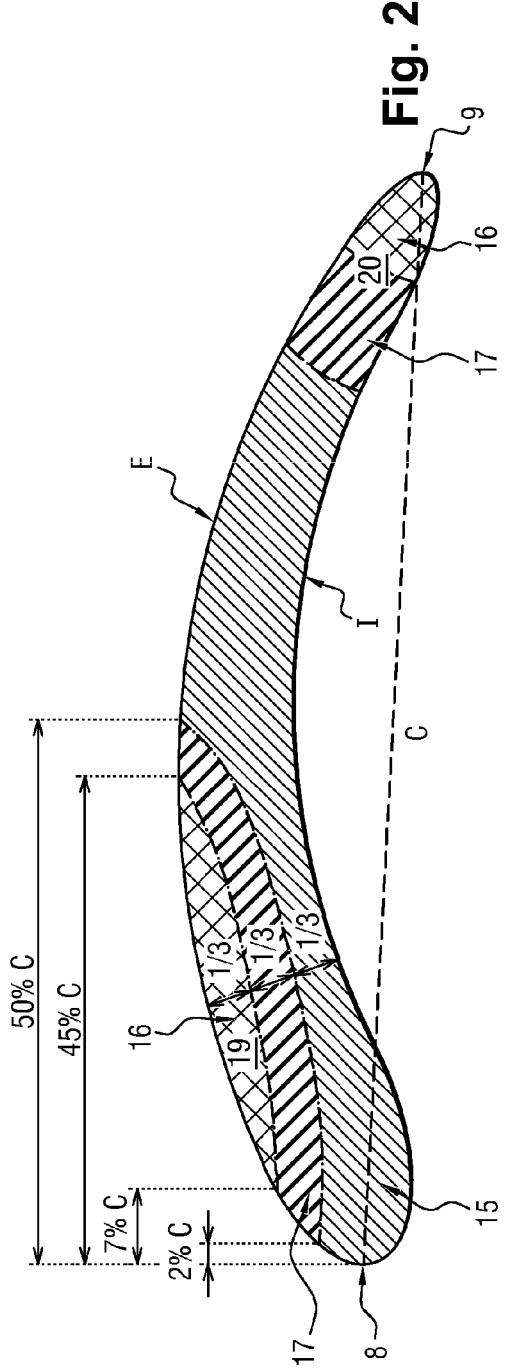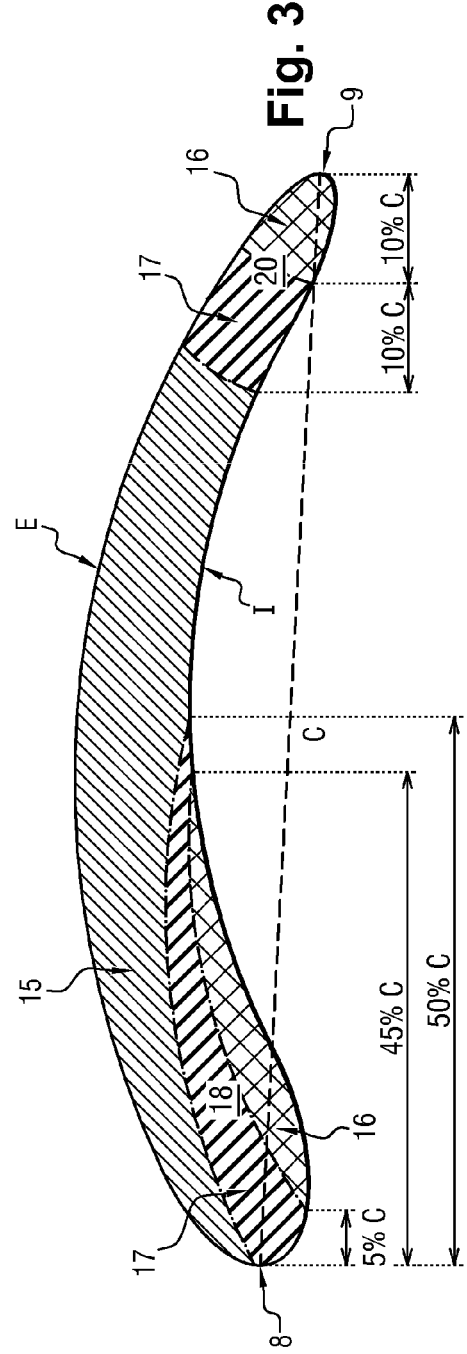

HYBRIDIZATION OF THE FIBERS OF THE FIBROUS REINFORCEMENT OF A FAN BLADE

FIELD OF THE INVENTION

The invention relates generally to the field of turbomachines, and more particularly that of fan blades of these turbomachines and their manufacturing method.

The invention applies more particularly to fan blades made of composite material and their interaction with the inlet of the primary stream.

PRIOR ART

Turbomachine blades, and particularly fan blades, undergo large mechanical and thermal stresses and must satisfy strict conditions of weight and bulk. It has therefore been proposed to use blades made of a composite material including a fibrous reinforcement densified by a polymer matrix, which are lighter compared to metal blades with equivalent propulsive characteristics and which have satisfactory resistance to heat.

During the certification and life of an engine, the fan blades are subjected to ingestions of birds and hailstones. However, depending on the type of object impacting the blade (and in particular its size, its mass) and depending on the type of fan (speed of rotation and number of blades), the favored areas of initiation and propagation of damage are different. The mechanical behavior of the fan blades is therefore optimized during the design phase of the blades to satisfy certification rules.

Moreover, current designs tend to reduce the thickness of the structure made of composite material of the blades in the areas of the leading edge, of the trailing edge or even over the entire structure in order to improve aerodynamic performance. With the same material and the same stacking law, the capacity of the blade to resist an impact is consequently reduced.

In order to improve the resistance of the blades to the impact of objects, particularly the ingestion of birds, it has been proposed to hybridize the fibers of the composite material. For example, it has been proposed to replace a part of the carbon fibers of the fibrous reinforcement forming the trailing edge of the blade made of composite material by glass fibers. This hybridization has allowed improving the behavior of the blades upon impact. However, taking into account the variable thickness of the blade, the management of property transitions between the fibers is complex and creates weakened areas at the carbon/glass fiber interface.

DISCLOSURE OF THE INVENTION

One object of the invention is therefore to overcome the aforementioned disadvantages by proposing a fan blade for a turbomachine, the behavior of which upon ingestion is improved without creating a weakened area.

Another object of the invention is to improve the hybridization of a blade produced in a composite material comprising a fibrous reinforcement densified by a matrix, and in particular to smooth the property change gradients in a simple and effective manner, while improving the behavior of the blade in the event of ingestion.

To this end, according to a first aspect, the invention proposes a turbomachine fan blade comprising a structure made of composite material comprising a fibrous reinforcement obtained by three-dimensional weaving of strands and a matrix in which the fibrous reinforcement is embedded. The fibrous reinforcement comprises a first portion and a second portion, distinct from one another, the strands of the fibrous reinforcement comprising first strands made of a first material having a first stiffness, and second strands made of a second material different from the first material and having a second stiffness smaller than the first stiffness. The first portion comprises only first strands, the second portion comprising only second strands. Moreover, the fibrous reinforcement also comprises a third portion positioned between the first portion and the second portion, the third portion comprising first strands, second strands and third strands at the same time, the third strands having a third stiffness smaller than the first stiffness and greater than the second stiffness. Moreover, within the third portion, a volume density of the first strands decreases progressively from the first portion in the direction of the second portion, a volume density of the second strands decreases progressively from the second portion in the direction of the first portion.

Certain preferred but non-limiting features of the fan blade according to the first aspect are the following, taken individually or in combination:
- the third portion comprises a first part in contact with the first portion, a second part in contact with the second portion and a central part extending between the first part and the second part, the first part being bereft of second strands and the second part being bereft of first strands;
- the central part comprises only third strands.
- the fan blade comprises a first area in which the second portion comprises a tang of the blade and a suction side wall up to a height comprised [between] 0% and 30% of a height of the airfoil and over a chord portion extending from an upstream limit extending at a distance from a leading edge of the blade comprised between 2% and 10% of the chord length, preferably on the order of 7%, and a downstream limit extending at a distance of a trailing edge of the blade comprised between 10% and 60% of the chord length, preferably on the order of 55%; and the third portion surrounds the second portion while extending on either side of the second portion over a chord length portion on the order of 5% of the chord length;
- the fan blade comprises a second area in which the second portion comprises a leading edge and a pressure side wall of the blade and extends over a height comprised between 40% and 65% of a height of the blade and a chord portion comprised between 20% and 40% of the chord length, for example on the order of 40%; and the third portion extends from the leading edge in the direction of the pressure side wall while surrounding the second portion over a portion with a length equal to 50% of the chord length;
- the second portion and the third portion each extend over a thickness equal to one-third of a thickness of the fibrous reinforcement;
- the fan blade comprises a third area in which: the second portion comprises a trailing edge of the blade, over all or a part of a height of the airfoil and over a length equal to at most 10% of a chord length; the third portion adjoins the second portion and extends along the second portion, over a length equal to at most 10% of the chord length; and the second portion and the third portion each extend over an entire thickness of the fibrous reinforcement;

the first strands, the second strands and the third strands comprise warp strands distributed so as to form warp columns;

the fan blade comprises a fourth area in which: the second portion comprises a tip of the blade and a trailing edge, over a height equal to at most 10% of the height of the blade and a length comprised between 40% and 100% of the chord length; the third portion extends from the tip of the blade over the entire length of the second portion and over a height equal to at most 5% of the height of the blade; and the second portion and the third portion each extend over an entire thickness of the fibrous reinforcement.

in which the first, second and third strands comprise weft strands distributed so as to form weft lines;

the fibrous reinforcement comprises only one first portion, one or more second portion(s) and one or more third portion(s);

the first strands have a modulus of elasticity comprised between 240 GPa and 350 GPa, preferably greater than or equal to 250 GPa, the first strands being able to comprise carbon fibers;

the second strands have a modulus of elasticity comprised between 150 GPa and 190 GPa, the third strands being able to comprise glass fibers or basalt fibers; and/or the third strands have an elastic modulus comprised between 180 and 250 GPa, the third strands being able to comprise aramid fibers.

According to a second aspect, the invention relates to a turbomachine fan comprising a plurality of fan blades conforming to the first aspect.

According to a third aspect, the invention proposes a turbomachine comprising a fan of this type and an aircraft comprising this turbomachine.

According to a fourth aspect, the invention proposes a fibrous reinforcement for a fan blade conforming to the first aspect.

DESCRIPTION OF THE FIGURES

Other features, objects and advantages of the invention will be revealed by the description that follows, which is purely illustrative and not limiting, and which must be read with reference to the appended drawings in which:

FIG. 2 is a section view of the fibrous reinforcement along plane A-A of FIG. 1;

FIG. 3 is a section view of the fibrous reinforcement along plane B-B of FIG. 1;

In all figures, similar elements bear identical reference symbols.

DETAILED DESCRIPTION OF THE INVENTION

Figure 1:
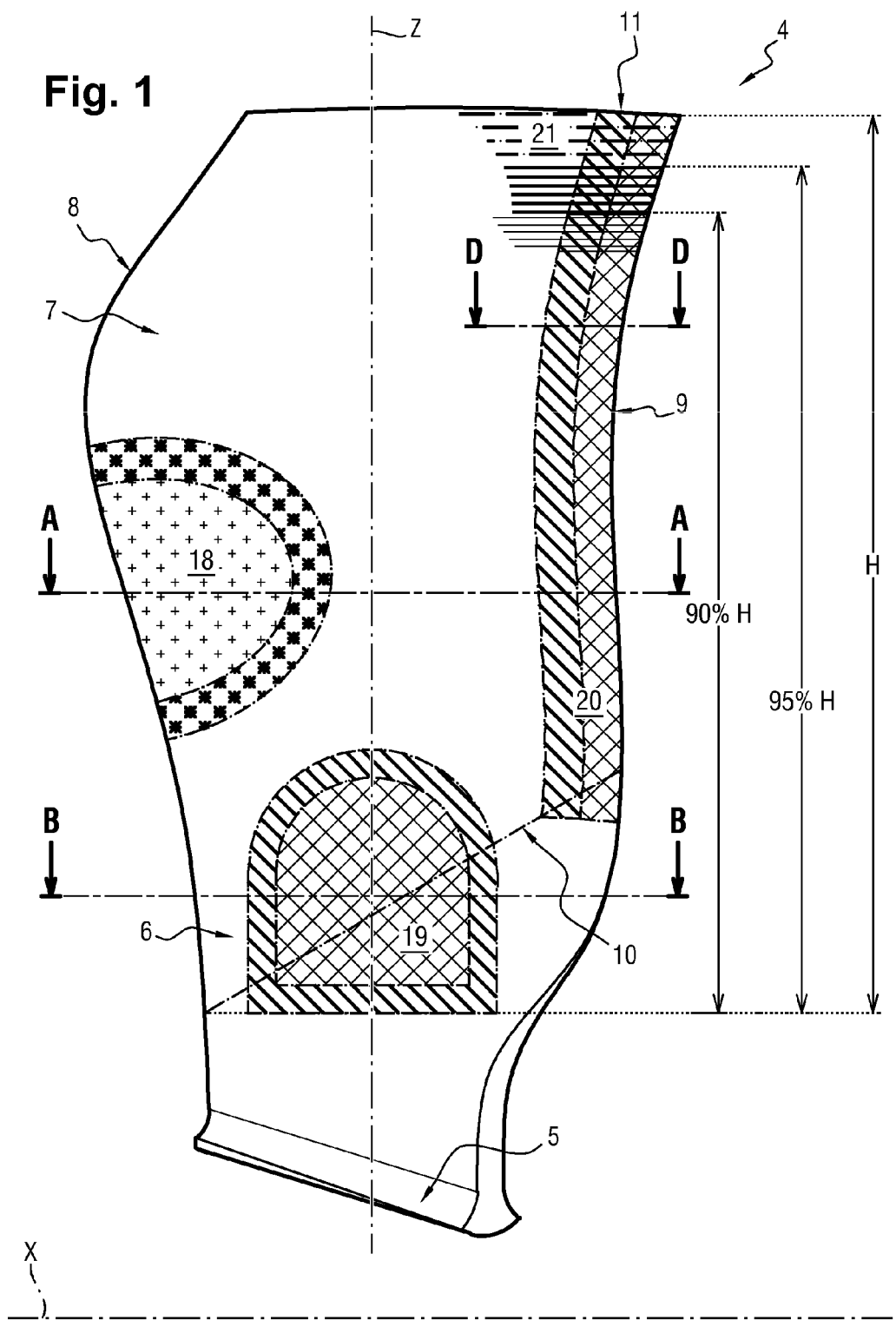
FIG. 1 is a schematic view showing an example of a fibrous reinforcement for a fan blade conforming to one embodiment, on which are shown several potential hybridization areas of the fibers of the fibrous reinforcement in conformity with one embodiment of the invention, including one transparency area (18)

In the present application, upstream and downstream are defined with reference to the normal flow direction of gas in the fan 1 through the turbomachine. Moreover, the axis X of radial symmetry of the fan 1 is called the axis of revolution of the fan 1. The axial direction corresponds to the direction of the axis X of the fan 1, and a radial direction is a direction perpendicular to this axis and passing through it.

A turbomachine fan 1 comprises a fan 1 disk 2 bearing a plurality of fan 1 blades 3 associated with inter-blade platforms.

Each blade 3 comprises a structure made of composite material including a fibrous reinforcement 4 obtained by three-dimensional weaving and a matrix in which the fibrous reinforcement 4 is embedded.

This structure made of composite material comprises a root 5, a tang 6 and an airfoil 7 with an aerodynamic profile. The root 5 is intended to allow the attachment of the blade 3 to the fan disk 2 and extends, to this end, between a bottom of an impression formed in the disk 2 and the outlet of the spans of the impression. The airfoil 7 with an aerodynamic profile, for its part, is able to be placed in a flow of air when the turbomachine is in operation, in order to generate a lift. Finally, the tang 6 corresponds to the area 20e of the airfoil 7 which extends between the root 5 and the airfoil 7, i.e. between the outlet of the spans and the inter-blade 3 platforms. The tang 6 is therefore not configured to extend into the flow of air.

The blade 3 also comprises, in a manner known per se, a leading edge 8, a trailing edge 9, a pressure-side I wall and a suction side E wall. The leading edge 8 is configured to extend facing the flow of the gases entering into the turbomachine. It corresponds to the anterior part of an aerodynamic profile which faces the flow of air and which divides the flow into a pressure side I flow and a suction side E flow. The trailing edge 9, for its part, corresponds to the posterior part of the aerodynamic profile where the pressure side I and suction side E flows are rejoined.

Finally, the structure is formed from a plurality of blade sections 3 stacked from the root 5 along a stacking axis Z extending radially with respect to the axis of revolution X of the fan 1.

Hereafter a distance along the stacking axis Z will be designated a "height." Thus, the airfoil 7 has a height H corresponding to the distance along the stacking axis Z between its lower limit 10, at the intersection with the tang 6, and its tip 11. The height H of the airfoil 7 is measured at the intersection between the leading edge 8 and the lower limit 10 of the airfoil 7.

The fibrous reinforcement 4 can be formed from a fibrous preform in a single piece obtained by three-dimensional or multilayer weaving with evolving thickness. It comprises warp and weft strands which can in particular comprise carbon, glass, basalt and/or aramid fibers. The matrix, for its part, is typically a polymer matrix, for example epoxy, bismaleimide or polyimide. The blade 3 is then formed by molding by means of a vacuum resin injection method of the RTM (for "Resin Transfer Molding") or VARRTM (for Vacuum Resin Transfer Molding) type.

FIG. 1 shows schematically a blade 3, the fibrous reinforcement 4 of which has been formed starting with a three-dimensionally woven fibrous preform, prior to the injection of resin or densification by a matrix and possible machining, in order to obtain a fan 1 blade 3 made of composite material conforming to the invention. What is meant by three-dimensional weaving is that the warp strands follow winding trajectories in order to link together weft strands belonging to layers of different weft strands, with the exception of unbinding areas, it being noted that three-dimensional weaving, particularly with an interlock pattern, can include 2D weaving at the surface. Different three-dimensional weave patterns can be used, such as interlock, multi-satin or multi-web patterns for example, as described in particular in document WO 2006/136755.

The strands of the fibrous reinforcement 4 comprise:
first strands 12 made of a first material having a first stiffness;
second strands 13 made of a second material different from the first material and having a second stiffness smaller than the first stiffness; and
third strands 14 made of a third material different from the first and the second material. The third material also has a third stiffness which is greater than the second stiffness and smaller than the first stiffness.

By way of a non-limiting example, the first strands 12 can be made of a material having a stiffness E (modulus of elasticity in tension, or first stiffness) between 240 GPa and 350 GPa, the second strands 13 of a material having a stiffness E (or second stiffness) between 150 GPa and 190 GPa and the third strands 14 of a material having a stiffness E (or third stiffness) between 180 GPa and 250 GPa. A factor between the values of the first and second stiffnesses E can for example be comprised between 1.5 and 2. A factor between the values of the first and third stiffnesses can for example be comprised between 1.5 and 1.2.

By way of an example, the first strands 12 can be made of carbon fibers having a first stiffness E greater than or equal to 250 GPa, the second strands 13 of glass fibers having a second stiffness E on the order of 165 GPa and the third strands 14 of aramid fibers having a third stiffness on the order of 200 GPa.

The elongation to failure of the first strands can be comprised between 1.5 and approximately 2.5, for example on the order of 2. The elongation to failure of the second strands can be comprised between approximately 4 and approximately 6, for example on the order of 5. The elongation to failure of the third strands can be comprised between approximately 2.5 and approximately 3. In a general manner, in a strand transition area, a maximum 30% gradient of loss of elongation to failure over 15 to 20 millimeters in one direction is considered, and/or a maximum of 30% gradient of loss of elongation to failure over 15 to 20 millimeters in this direction or another direction.

The first strands 12, the second strands 13 and the third strands 14 are distributed in the fibrous preform so as to form a first portion 15, a second portion 16 and a third portion 17 such that:
the first portion 15 comprises only first strands 12;
the second portion 16 is separate and distinct from the first portion 15 and comprises only second strands 13; and
the third portion 17 is positioned between the first portion 15 and the second portion 16 and comprises third strands 14.

In addition, in order to smooth the property gradients between the first and the second portion 15, 16, the third portion 17 also comprises first strands 12 and second strands 13 in addition to the third strands 14, knowing that, within the third portion 17, a volume density of the first strands 12 decreases progressively from the first portion 15 in the direction of the second portion 16 and a volume density of the second strands 13 decreases progressively from the second portion 16 in the direction of the first portion 15.

In one embodiment, the fibrous reinforcement 4 comprises only one first portion 15, one or more second [portion(s)] 16 and one or more third portion(s) 17.

Optionally, the fibrous reinforcement 4 can comprise several second portions, distinct from one another and separated two by two from the first portion 15 by an associated third portion 17.

More precisely, the first strands 12 have a high modulus of elasticity, for example greater than 250 GPa, and have as their function to allow the design criteria of the blade 3 to be satisfied, and particularly the frequency status of the blade 3. The first portion 15 therefore forms the major part of the fibrous reinforcement 4, and in particular the portion of the fibrous reinforcement 4 which overall comprises the low and thick parts of the blade 3 (namely the root 5 of the blade 3, the tang 6 and a lower part of the airfoil 7) and a major part of the suction side E wall of the blade 3 so that the natural frequencies of the blade 3 are high. This thus allows limiting or at least separating frequency intersections between the first, energetic, natural modes of the blade 3 and the engine harmonics.

The second strands 13, for their part, the stiffness (elastic modulus E) of which is lower than that of the first strands 12, have as their function to limit the initiation and the propagation of damage to the blade 3 during the ingestion of objects, and particularly birds. The second portion(s) 16 thus form the portion(s) of the reinforcement 4 which are likely to be strongly loaded in the event of an ingestion of an object. Typically, and as will be detailed hereafter, in the case of a blade 3 likely to receive an impact of the type of a heavy bird ("large bird"), the second portion 16 extends over a portion of the leading edge 8 (in the central part of the blade 3, at a distance from its lower limit 10 and from its tip 11 and on the pressure side I) (area 18) and/or at the tang 6 on the suction side E (area 19). Moreover, when the blade 3 is likely to receive an impact of the medium bird type, the second portion 16 extends over all or part of the trailing edge 9 (area 20) and/or at the blade 3 tip 11 (area 21), over the entire thickness of the blade 3. Of course, the second portion 16 can extend [over] all or part of the areas 18-21.

The third portion(s) 17 extend between the first portion 15 and the second portion 16 and are configured to serve as an interface between the first portion 15 and the second portion 16 in order to limit weaknesses due to discontinuities of materials. When the strands of the fibrous reinforcement 4 comprise only first strands 12 in the first portion 15 of the blade 3 and only second strands 13 in the second portion 16 of the blade 3, and the first portion 15 and the second portion 16 are end to end in the reinforcement 4, the blade 3 thus obtained effectively allows avoiding damage to the blade 3 in the areas 18-21 comprising the second strands 13. However, the Applicant has noticed the fact that in the absence of a third portion 17, i.e. by abruptly introducing second strands 13 and by simultaneously eliminating the first strands 12 at the interface between the first portion 15 and the second portion 16 of the fibrous reinforcement 4, the blade 3 obtained risked being strongly damaged at this interface in the event of an impact, because the interface between the two portions 11, 12 of the reinforcement 4 is weakened by the strong discontinuity of the material properties. The simple mixing of the first and second strands 12, 13 also does not allow sufficient smoothing of the property gradients, taking into account the large gap between their respective stiffnesses. The smoothing is thus accomplished due to the introduction, in the third portion 17, of third strands 14 and to the progressive reduction of the volume density of the first and second strands 12, 13 in said third portion 17.

The third portion 17 thus allows making a smooth and regular transition between the material properties of the first portion 15 and the material properties of the second portion 16. To this end, the volume density of the second strands 13 is progressively increased within the third portion 17, from the first portion 15 toward the second portion 16. Thus, at the interface between the first portion 15 and the third portion 17, the volume density of the second strands 13 is zero, the volume density of the third strands 14 is low while the volume density of the first strands 12 is very high. On the other hand, at the interface between the third portion 17 and the second portion 16, the volume density of the second strands 13 is very high while the volume density of the first strands 12 is zero and that of the third strands 14 is low.

In order to optimize the resistance of the blade 3 to impacts of objects, excepting in the area 21 comprising the blade 3 tip 11, the second strands 13 are warp strands of the reinforcement 4, (i.e. strands extending along the stacking axis Z of the blade 3 sections). In fact, in the areas 18-20, damage (or the rupture of the blade 3) is initiated in the chord direction, the fissure being in the radial direction, so that the strength of the reinforcement must be reinforced in the warp direction.

On the other hand, in the area 21 comprising the blade 3 tip 11, the second strands 13 comprise weft strands.

In the area 18, the second portion 16 extends at the leading edge 8 over a chord length portion comprised between 10% and 50% of the total chord C of the blade 3. Preferably, the chord length portion C is comprised between 20% and 40% of the total chord C of the blade 3, for example on the order of 40%. What is meant here by chord C, for a given section of the blade 3 (and therefore for a given point of the stacking axis Z) is the substantially axial straight-line segment which connects the leading edge 8 to the trailing edge 9 of the blade 3.

As previously indicated, the second portion 16 extends in the central part of the blade 3, over only a part of the height of the airfoil 7. In one embodiment, the lower edge of the second portion 16 is at a distance (measured from the lower limit 10 of the blade 3) equal to at least 10% of the height H of the blade 7, preferably at a distance equal to approximately 40% of this height H. Moreover, the upper edge of the second portion 16 is at a distance (measured from the lower limit 10 of the blade 3) equal to at most 70% of the height H of the airfoil 7, preferably at a distance equal to approximately 65% of this height H.

In one exemplary embodiment, in order to optimize the resistance of the blade 3 to the impact of large birds, the lower edge of the second portion 16 is at a distance equal to 40% of the height H of the airfoil 7 and its upper edge at a distance equal to 65% of said height H (these distances being measured from the lower limit 10 of the blade 3). This exemplary embodiment allows both improving the behavior of the blade 3 in the event of ingesting large birds, but also facilitating its manufacture and limiting the additional unwinding induced by the fact that the second strands 13 have a smaller modulus of elasticity than the first strands 12.

Moreover, the second portion 16 is positioned at the pressure side I wall and does not extend until the suction side E wall. In the area 18, the second portion 16 therefore does not extend over the entire thickness of the fibrous reinforcement 4, but only at its skin.

In the area 18, the third portion 17 is then positioned so as to form an interface at every point between the second portion 16 and the first portion 15. The second portion 16 is therefore encapsulated in the third portion 17, except at the pressure side I wall where the second portion 16 forms said pressure side I wall. Thus, the third portion 17 extends:

between the lower edge of the second portion 16 and the tang 6 over a portion with a height which can be comprised between 5% and 10% of the height H of the airfoil 7;

between the upper edge of the second portion 16 and the tip 11 over a portion with a height which can be comprised between 5% and 10% of the height H of the airfoil 7;

on either side of the second portion 16 in the direction of the leading edge 8 and of the trailing edge 9 over a chord length portion C on the order of 5% of the chord length C; and between the second portion 16 and the suction side E wall over a thickness (dimension following an axis perpendicular to the stacking axis and substantially normal to the pressure side I wall at the measurement point) equal to one-third of the total thickness of the fibrous reinforcement 4.

As can be seen in FIG. 3, in the area 18, the leading edge 8 thus comprises successively, from the pressure side I wall to the suction side E wall, the second portion 16, the third portion 17 and the first portion 15, each of these portions 15, 16, 17 having (in a plane normal to the stacking axis Z intersecting the third portion 17) a thickness substantially equal to one-third the total thickness of the fibrous reinforcement (in this plane).

In the area 19, the second portion 16 extends at a distance from the leading edge 8 and from the trailing edge 9, over a chord length portion comprised between 10% and 50% of the total chord C of the blade 3. Preferably, the chord length portion C is comprised between 30% and 40% of the total chord C of the blade 3, for example on the order of 38%. Moreover, the upstream limit (leading edge 8 side) of the second portion 16 extends at a distance from the leading edge 8 comprised between 2% and 10% of the chord length C, preferably on the order of 7%, and the downstream limit (trailing edge 9 side) of the second portion 16 extends at a distance from the trailing edge 9 comprised between 10% and 60% of the chord length C, preferably on the order of 55%.

As previously indicated, the second portion 16 extends in the lower part of the blade 3, over only a part of the height H of the airfoil 7. In one embodiment, the second portion 16 extends from the tang 6 to a height less than or equal to 30% of the height H of the airfoil 7.

The second portion 16 is also positioned at the suction side E wall and does not extend to the pressure side I wall. The thickness of the second portion 16 is comprised between 10% and 40% of the thickness of the fibrous reinforcement 4, preferably approximately one-third of the total thickness. In the area 19, the second portion 16 thus does not extend over the entire thickness of the fibrous reinforcement 4, but only at its skin.

In the area 19, the third portion 17 is then positioned so as to form an interface at every point between the second portion 16 and the first portion 15. The second portion 16 is therefore encapsulated in the third portion 17, except at the suction side E wall where the second portion 16 is in the skin. Thus, the third portion 17 extends:

between the lower edge of the second portion 16 and the root 5 over a portion with a height which can be comprised between 5% and 10% of the height H of the airfoil 7;

between the upper edge of the second portion 16 and the tip 11 over a portion with a height which can be comprised between 5% and 10% of the height H of the airfoil 7;

on either side of the second portion 16 in the direction of the leading edge 8 and of the trailing edge 9 over a chord length portion C on the order of 5% of the chord length C; and between the second portion 16 and the pressure side I wall, over a thickness (in a plane normal to the stacking axis Z intersection the third portion 17) equal to one-third of the total thickness of the fibrous reinforcement 4 (in this plane).

In the area 20, the second portion 16 extends over a chord length portion C on the order of 10% of the total chord length C, at any point of the stacking axis Z of the blade 3.

Preferably, the second portion 16 extends from the tip 11 of the blade 3. Ideally, in order to optimize the resistance of the blade 3 to bird impacts, the second portion 16 extends substantially over the entire height of the blade 3, i.e. from the tip 11 to the root 5 of the blade 3 (or as a variant to the tang 6).

In a variant embodiment, in order to simplify the certification of the root 5/tang 6 area of the blade 3 and to improve the behavior of the trailing edge 9 with respect to the ingestion of all types of objects (large birds, medium birds and small birds), the second portion 16 may only extend over a part of the height of the airfoil 7 to a lower edge extending at a distance comprised between 0% (case where the second portion 16 extends over the entire airfoil 7) and 65% of the height H of the airfoil 7. The height of the second portion 16 in the area 20 is therefore comprised between 35% and 100% of the height G of the airfoil 7.

In another variant embodiment, the distance between the lower limit 10 of the blade 3 and the lower edge of the second portion 16 (along the stacking axis Z of the blade 3) is greater than 65% of the height H of the airfoil 7. The height of the second portion 16 is therefore less than 35% of the height H of the airfoil 7. This second variant embodiment allows facilitating manufacture and limiting the additional unwinding induced by the fact that the stiffness of the second strands 13 is less than that of the first strands 12. However, the behavior improvement of the trailing edge 9 with respect to the ingestion of objects of the medium bird type and small birds is less in comparison with the first embodiment.

It follows that the dimensioning of the blade 3 allows determining the distance starting from which the second strands 13 are introduced into the fibrous reinforcement 4, in order to combine the necessary stiffness for the frequency status (first strands 12) and the elongation to failure (second strands 13) for resisting ingestion.

In the area 20, the second portion 16 extends over the entire thickness of the fibrous reinforcement 4, from the pressure side I wall to the suction side E wall.

In this area 20, the third portion 17 is then positioned so as to form an interface at every point between the second portion 16 and the first portion 15. The third portion 17 therefore extends from the second portion 16 and the tip 11 of the blade 3, over the entire thickness of the fibrous reinforcement 4, and between the lower edge of the second portion 16 and the root 5.

Thus, the third portion 17 extends:

between the lower edge of the second portion 16 and the root 5 over a portion with a height which can be comprised between 5% and 10% of the height H of the airfoil 7;

from the second portion 16 in the direction of the leading edge 8, over a chord length portion C on the order of 10% of the chord length C; and over the entire thickness of the fibrous reinforcement 4.

In area 21, the second portion 16 extends from the trailing edge 9 and comprises the tip 11 over the entire thickness of the reinforcement 4, over a chord length portion comprised between 40% and 100% of the total chord C of the blade 3. Preferably, the chord C length portion is comprised between 40% and 80% of the total chord C of the blade 3.

In addition, the second portion 16 extends over 5% to 10% of the height H of the airfoil 7, preferably on the order of 5%.

In the area 19, the third portion 17 is then positioned so as to form an interface at every point between the second portion 16 and the first portion 15. The second portion 16 is therefore bordered by the third portion 17. Thus, the third portion 17 extends:

between the lower edge of the second portion 16 and the root 5 over a portion with a height which can be comprised between 5% and 10% of the height H of the airfoil 7, preferably on the order of 5%;

from the second portion 16 in the direction of the leading edge 8, over a chord C length portion on the order of 5% of the chord length C; and over the entire thickness of the fibrous reinforcement 4.

The geometry of the second portions 16 in the areas 18-21 can be arbitrary. In fact, as defined above, the areas 18-21 allow modifying the mechanical properties of the blade 3 in the area where a flake could form. The geometry of the areas 18-21 can therefore be selected depending on tests or simulations which allow identifying the area most likely to form a flake for a fibrous texture under consideration.

When the fibrous reinforcement 4 comprises both second and third portions 16, 17 in the areas 20 and 21, the fibrous reinforcement then comprises third strands 14 in the warp direction and in the weft direction in the parts of these areas 20, 21 which overlap.

Figure 4:
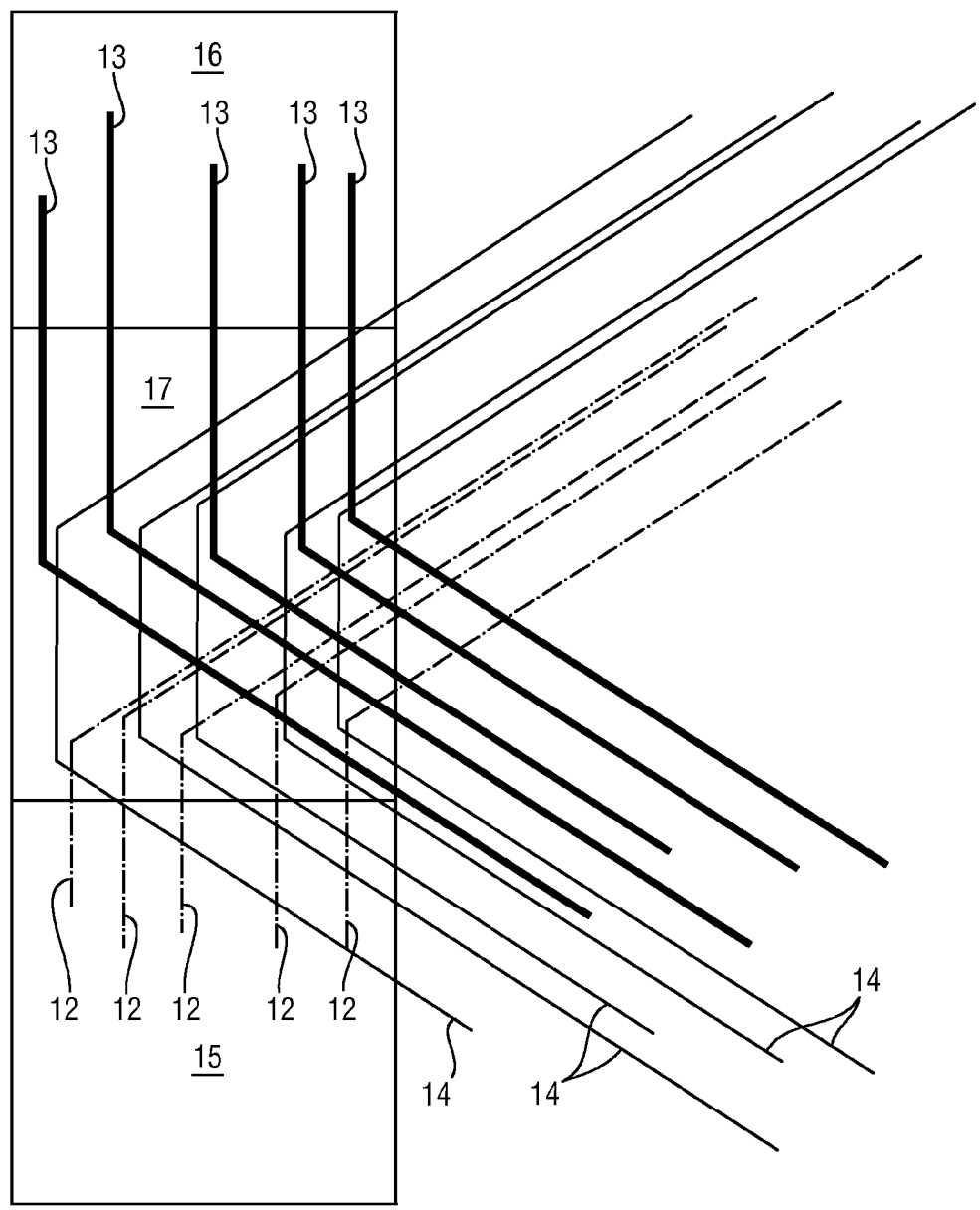
FIG. 4 is a schematic view illustrating in a simplified manner an example of hybridization of the first, second and third strands within a third portion of a fibrous reinforcement conforming to the invention.
Figure 5:
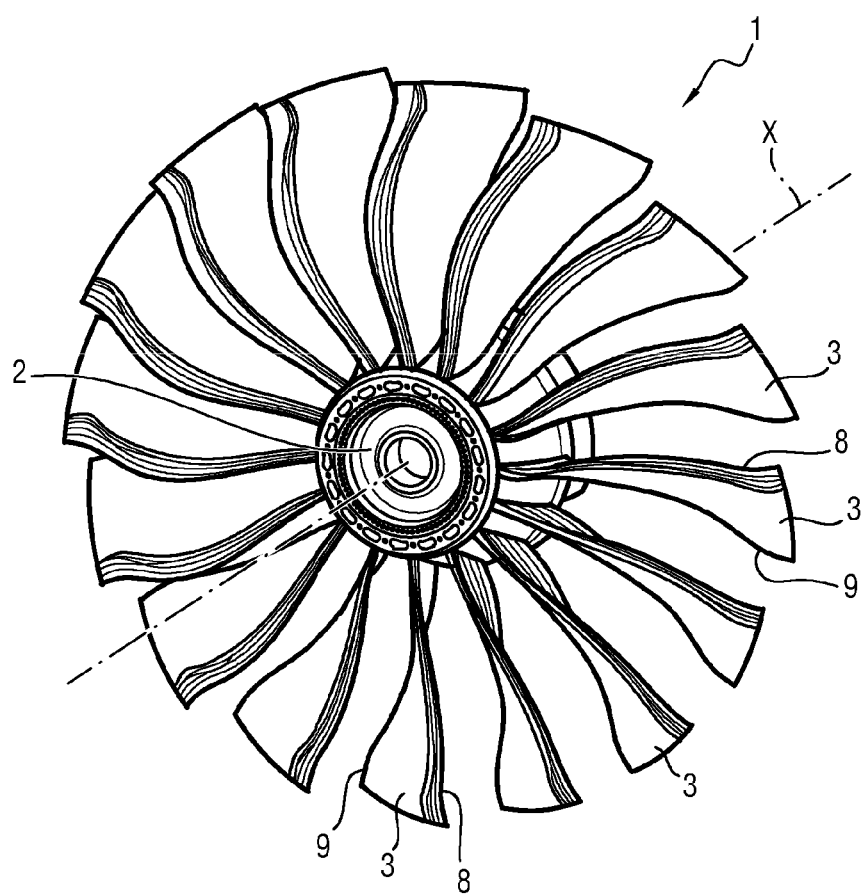
FIG. 5 is a perspective view of an exemplary embodiment of a fan comprising blades conforming to the invention.

The modification of volume density of the first, second and third strands 12, 13, 14 can be accomplished by having the strands successively enter/leave the weave of the preform, at the different warp planes (in the areas 18-20) or weft planes (in area 21) constituting the third portion 17, as illustrated schematically in FIG. 4. Typically, at the interface between the first and the second portion 17, the first strands 12 are removed progressively by cutting them at the surface of the preform prior to injection and by simultaneously introducing the third strands 14 between these warp (respectively, weft) planes. Likewise, at the interface between the third and the second portion 16, the third strands 14 are progressively removed and the second strands 13 are simultaneously introduced between these warp (respectively weft) planes. In this manner, the first portion 15, the second portion 16 and the intermediate portion 16 are formed from a single part during weaving.

Document FR 3 087 701 filed by the Applicant can also be referred to for an exemplary embodiment of the hybridization of warp strands. The same mode of operation can be implemented for the weft strands (area 21).

Generally, the configurations described are valid for engines of which the fan can have an outer diameter on the order of 1.8 to 3 meters. The number of blades 3 of the fan can be equal to 16 or 18. Regardless of the diameter of the fan, the number of fan blades 3 will be reduced as much as possible. Among different criteria, a selection of parameters (particularly the areas 18, 19, 20 and/or 21 comprising the second and third portion(s)) will depend more particularly on the behavior of the fan blade 3 and on the "frequency/dimensioning for ingestion" combination. In fact, for the same engine target, it is possible to select different strategies of frequency behavior or frequency response in different ingestion cases, for example to push back the blade 3 and blading responses by avoiding vibrational intersections with the energetic harmonics of the engine. For example, it is possible to make a selection so as to position the intersections at transient engine speeds.

The hybridization of the strands of the fibrous reinforcement 4 also allows widening the design field due to the additional contribution of mechanical strength. For example, it becomes possible to refine the profile of the blade 3 at the leading edge 8 of the preform 4 or at the trailing edge 9 of the preform 4 or over the entire height H of the airfoil 7 in comparison with a blade 33 containing only the first strands 12 (with a high modulus of elasticity), which allows optimizing the mass of the blade 3 and the aerodynamic performance of the fan 1 (by obtaining thinner profiles or by reducing the hub ratio, which is linked to the reduction of the centrifugal force induced by the mass of the blade 3).

The invention claimed is:

1. A turbomachine fan blade comprising a structure made of composite material comprising a fibrous reinforcement obtained by three-dimensional weaving of strands and a matrix wherein is embedded the fibrous reinforcement, the fibrous reinforcement comprising a first portion and a second portion distinct from one another, the strands of the fibrous reinforcement comprising first strands made of a first material having a first stiffness and second strands made of a second material different from the first material and having a second stiffness smaller than the first stiffness, the first portion comprising only first strands, the second portion comprising only second strands,
wherein the fibrous reinforcement also comprises a third portion positioned between the first portion and the second portion, the third portion comprising first strands, second strands and third strands at the same time, the third strands having a third stiffness smaller than the first stiffness and greater than the second stiffness, and wherein, within the third portion, a volume density of the first strands decreases progressively from the first portion in the direction of the second portion, a volume density of the second strands decreases progressively from the second portion in the direction of the first portion.

2. The fan blade according to claim 1, wherein the third portion comprises a first part in contact with the first portion, a second part in contact with the second portion and a central part extending between the first part and the second part, the first part being bereft of second strands and the second part being bereft of first strands.

3. The fan blade according to claim 2, wherein the central part comprises only third strands.

4. The fan blade according to claim 1, comprising a first area wherein:
the second portion comprises a tang of the blade and a suction side wall up to a height comprised between 0% and 30% of a height of the airfoil and over a chord portion extending from an upstream limit extending at a distance from a leading edge of the blade comprised between 2% and 10% of the chord length, and a downstream limit extending at a distance from a trailing edge of the blade comprised between 10% and 60% of the chord length; and
the third portion surrounds the second portion while extending on either side of the second portion over a chord length portion on the order of 5% of the chord length.

5. The fan blade according to claim 4, wherein the second portion and the third portion each extend over a thickness equal to one-third of a thickness of the fibrous reinforcement.

6. The fan blade according to claim 1, comprising a second area wherein:
the second portion comprises a leading edge and a pressure side wall of the blade and extends over a height comprised between 40% and 65% of a height of the blade and a chord portion comprised between 20% and 40% of the chord length; and
the third portion extends from the leading edge in the direction of the pressure side wall while surrounding the second portion over a portion with a length equal to 50% of the chord length.

7. The fan blade according to claim 1, comprising a third area wherein:
the second portion comprises a trailing edge of the blade, over all or part of a height of the airfoil and over a length equal to at most 10% of a chord length;
the third portion adjoins the second portion and extends along the second portion, over a length equal to at most 10% of the chord length; and
the second portion and the third portion each extend over an entire thickness of the fibrous reinforcement.

8. The fan blade according to claim 1, wherein the first strands, the second strands and the third strands comprise warp strands distributed so as to form warp columns.

9. The fan blade according to claim 1, comprising a fourth area wherein:
the second portion comprises a tip of the blade and a trailing edge, over a height equal to at most 10% of the height of the blade and a length comprised between 40% and 100% of the chord length;
the third portion extends from the tip of the blade over the entire length of the second portion and over a height equal to at most 5% of the height of the blade; and
the second portion and the third portion each extend over an entire thickness of the fibrous reinforcement.

10. The fan blade according to claim 9, wherein the first, second and third strands comprise weft strands distributed so as to form weft lines.

11. The blade according to claim 1, wherein the fibrous reinforcement comprises only one first portion, one or more second portion(s) and one or more third portion(s).

12. The blade according to claim 1, wherein the first strands have a modulus of elasticity comprised between 240 GPa and 350 GPa, the first strands being able to comprise carbon fibers.

13. The blade according to claim 12, wherein the first strands have a modulus of elasticity greater than or equal to 250 GPa.

14. The blade according to claim 12, wherein the third strands have a modulus of elasticity comprised between 180 GPa and 250 GPa, the third strands being able to comprise aramid fibers.

15. The blade according to claim 1, wherein the second strands have a modulus of elasticity comprised between 150 GPa and 190 GPa, the second strands being able to comprise glass fibers or basalt fibers.

16. A turbomachine fan comprising a plurality of blades conforming to claim 1.

17. A fibrous reinforcement for a fan blade according to claim 1.

* * * * *